(12) United States Patent
Sheen et al.

(10) Patent No.: US 6,375,997 B1
(45) Date of Patent: Apr. 23, 2002

(54) PROCESS FOR MAKING SNACK FOODS HAVING TWO OR MORE FILLED AXIAL CAVITIES

(75) Inventors: Shiowshuh Sheen, New Providence Boro; Marc Baggen, Franklin Township; Joseph Panarisi, Ocean Township; Alan J. Slesinski, South Bound Brook Boro, all of NJ (US)

(73) Assignee: Bestfoods, Englewood Cliffs, NJ (US)

( * ) Notice: Subject to any disclaimer, the term of this patent is extended or adjusted under 35 U.S.C. 154(b) by 0 days.

(21) Appl. No.: 09/561,420

(22) Filed: Apr. 28, 2000

Related U.S. Application Data

(63) Continuation-in-part of application No. 09/526,347, filed on Mar. 16, 2000, now Pat. No. 6,328,550.

(51) Int. Cl.[7] .............................. A21D 2/36; A21D 8/02; A23L 1/216; A23P 1/12
(52) U.S. Cl. ...................... 426/283; 426/284; 426/514; 426/516; 426/550; 426/637
(58) Field of Search ................................. 426/283, 284, 426/637, 512, 514, 516, 517, 550, 272

(56) References Cited

U.S. PATENT DOCUMENTS

| 3,056,683 A | 10/1962 | Cyr |
| 3,399,062 A | 8/1968 | Willard, Jr. et al. |
| 3,468,673 A | 9/1969 | Keller |
| 3,687,688 A | 8/1972 | Stapley et al. |
| 3,767,338 A | 10/1973 | Soderlund et al. ........... 425/131 |
| 3,876,743 A | 4/1975 | Soderlund et al. ............ 264/75 |
| 3,975,549 A | 8/1976 | Shatila et al. ................ 426/550 |
| 3,987,210 A | 10/1976 | Cremer ........................ 426/550 |
| 4,005,139 A | 1/1977 | Kortschot et al. ........... 426/550 |
| 4,007,292 A | 2/1977 | Shatila et al. ................ 426/637 |
| 4,259,051 A | 3/1981 | Shatila ..................... 425/133.1 |
| 4,484,877 A | 11/1984 | Stucke et al. ................ 425/113 |
| 4,613,509 A | 9/1986 | Ward et al. .................. 426/283 |
| 4,614,489 A | 9/1986 | Juravic .................... 425/376 R |
| 4,618,499 A | 10/1986 | Wainwright ................. 426/283 |
| 4,647,468 A | 3/1987 | Pinto .......................... 426/503 |
| 4,648,821 A | 3/1987 | Thulin ..................... 425/133.1 |
| 4,663,180 A | 5/1987 | Padula ........................ 426/637 |
| 4,689,236 A | 8/1987 | Pinto .......................... 426/502 |
| 4,828,856 A | 5/1989 | Willard ....................... 426/272 |
| 4,888,192 A | 12/1989 | Ramnarine .................. 426/448 |
| 4,900,572 A | 2/1990 | Repholz et al. ............. 426/282 |
| 4,900,573 A | 2/1990 | Meyers et al. .............. 426/302 |
| 4,915,968 A | 4/1990 | Matthews et al. .......... 426/513 |
| 4,931,296 A | 6/1990 | Shanbhag et al. .......... 426/243 |
| 5,242,699 A | 9/1993 | Bednar et al. .............. 426/302 |
| 5,492,704 A | 2/1996 | Stubbs et al. ................. 426/96 |
| 5,527,179 A | 6/1996 | Mochizuki .................. 425/467 |
| 5,601,861 A | 2/1997 | Gerrish et al. .............. 426/303 |
| 5,609,903 A | 3/1997 | Israel et al. ................. 426/500 |
| 5,620,727 A | 4/1997 | Gerrish et al. .............. 426/302 |
| 5,622,741 A | 4/1997 | Stubbs et al. ............... 426/243 |
| 5,645,872 A | 7/1997 | Funahashi ................... 425/380 |
| 5,753,286 A | 5/1998 | Higgins ........................ 426/92 |
| 5,874,120 A | 2/1999 | Borek et al. ................. 426/500 |
| 5,891,496 A | 4/1999 | Hannah et al. ............. 426/102 |

Primary Examiner—Arthur L. Corbin
(74) Attorney, Agent, or Firm—Ellen Plotkin

(57) ABSTRACT

A process for making a tubular shaped hand held convenience snack food type product comprising the steps of formulating dough comprising potato shreds, cellulose gum and starch, extruding the dough through a multiple extrusion nozzle to form continuous ropes having two or more axial cavities which can be filled with savory fillings, optionally compressing the ropes, cutting and crimping ropes to form uncooked cut casings and then cooking and freezing. The dough has a moisture content of about 55% to about 75%, preferably about 60% to about 72%, to facilitate extrusion without impairing the potato shred material.

23 Claims, 7 Drawing Sheets

PROCESS FOR MAKING SNACK FOODS HAVING TWO OR MORE FILLED AXIAL CAVITIES

CROSS-REFERENCE TO RELATED APPLICATIONS

This is a Continuation-in-Part of application Ser. No. 09/526,347, filed Mar. 16, 2000 entitled "Tube-Shaped Snack Foods and Methods of Making Same". This application is also related to U.S. Pat. No. 6,328,550, entitled "Nozzle for Making Snack Foods Having Two or More Filled Axial Cavities" which was filed on the same date herewith and is a Continuation-in-Part of said application Ser. No. 09/526,347.

BACKGROUND OF THE INVENTION

1. Field of the Invention

The invention concerns a process for making hand held and convenience snack food products comprising potato shreds. The process comprises formulating dough having a moisture content of about 55% to about 75%, preferably about 60% to about 72%, comprising potato shreds, cellulose gum, starch and other ingredients. The dough is extruded through a multiple extrusion nozzle, which in preferred embodiments comprises an outer extrusion segment and an inner extrusion segment which can be inserted into the outer extrusion segment to provide for extrusion of continuous ropes or casings having two or more axial cavities which are filled with savory fillings. If the continuous ropes are not of desired size and/or shape following extrusion, the continuous ropes may optionally be subjected to a roll over operation. The continuous ropes are cut and crimped to form uncooked cut casings. The uncooked cut casings are then cooked by baking, frying, par-baking or par-frying, combinations thereof or otherwise, and frozen to obtain the handheld convenience snack food product.

2. The Related Art

Hand held convenience snack foods having a filling surrounded by a casing typically have casings made from bakery formulas involving pastry dough. Bakery formulas generally involve grains and flours and the pastry dough tends to be homogenous which is both easy to form by extrusion or other means, or otherwise easy to fill. An example is cereal bar mixes made with pastry dough comprising multi-grains, and although these materials tend to have coarser grains compared to other pastry dough ingredients, the particles have substantial uniformity thus facilitating extrusion and filling.

Potato shreds are nonuniform and have bigger and longer particle size compared to grains and flours. As a result, dough comprising potato shreds lacks uniformity and is more difficult to handle and extrude. Dough comprising potato shreds will have the tendency to form open surfaces after extrusion or during the forming or filling process.

U.S. Pat. No. 4,888,192 concerns a method of extruding baked goods in the form of an extruded rope comprised of three materials. An outer expanded crispy layer and two non-dough filler materials are described as components. The dough is extruded under pressure and expands upon release from the nozzle surrounding a pair of tubes which place the filling into the center of the tubes. The filling material is supplied to the extruder through separate tubes and there is no discussion in the patent that the nozzle and/or extruder can be used to extrude dough comprising potato shreds.

U.S. Pat. No. 4,259,051 addresses extrusion apparatus for forming a hollow foodstuff of extruded plastic material which can be simultaneously filled. There is no discussion in the patent that the apparatus can be used for potato shred dough, and the apparatus cannot likely be used for extruding a plurality of axial cavities.

U.S. Pat. No. 5,527,179 describes an apparatus for extruding dough in hollow form through the use of a solid pin within the extrusion nozzle. U.S. Pat. No. 4,900,572 describes an apparatus for making dog food where an outer layer is extruded into a chamber having sleeves. An inner layer is extruded through the sleeves and, thus, the inner layer becomes covered by the outer layer. U.S. Pat. No. 5,645,872 describes extrusion of hollow shapes of material subject to coagulation by allowing gas or liquid to flow into the center cavity after extrusion to foster coagulation and avoid collapse of the hollow extruded shape.

U.S. Pat. No. 4,828,856 describes hash brown type potato products made from de-hydrated formed or fabricated potato shreds which can be re-hydrated and formed into patties said to simulate fresh cut potato products. The re-hydrated mass has a moisture content of 40% to 55% so that the product can be sheeted with a 1 to 2 millimeter opening between sheeting rolls. The potato dough made from the shreds described in this patent cannot be extruded because of needed high extrusion pressures which are said to rupture a significant portion of the potato cells. Non-critical ingredients for these products are carboxymethylcellulose, which is said to be a processing aid for the sheeting operation, and certain food gums to reduce fat or oil pickup (uptake) during frying. U.S. Pat. No. 5,492,704 describes a process for making potato strands comprising shreds for use in hash brown potatoes, and re-hydration of the shreds in the form of sheets to make a hash brown potato product is exemplified in the patent.

U.S. Pat. No. 5,891,596 describes potato mixtures shaped by extrusion or otherwise that are processed as a reduced fat flash frozen potato product. The formed potato shapes are made from blended potato pieces, and the blended product contains small pieces and, thus, not potato shreds. U.S. Pat. No. 3,399,062 describes dehydrated granular products, such as crushed dehydrated potatoes, containing some aggregates of individual cells, re-hydrated at low temperature in the presence of cellulose ether thermal gelling agent and extruded to obtain a french fried potato product.

U.S. Pat. No. 3,975,549 describes agglomerated dehydrated potato products made from dehydrated potato particles that, after re-hydration with a binder, are extruded to form french fries. The binder may be either a gum, such as guar gum, or free starch from modifying the potato solids. U.S. Pat. No. 3,987,210 describes an extruded french fried potato product comprising dehydrated potatoes in the form of flakes, granules, flour, diced pieces or mixtures thereof with a binder comprising more than about 25% amylose starch. The starch is said to retrograde when heated with water to form a film around the product and provide an oil barrier.

U.S. Pat. No. 3,486,673 describes extruded french fried potato products comprising dehydrated mashed potatoes, methyl cellulose and polygalacomannan gum, which are said to be essential ingredients. The combination of ingredients reportedly provide the product with an irregular external crust which permits the product to pick up a modest amount oil during frying. U.S. Pat. No. 5,242,699 addresses an application of a hydrocolloid coating to potato strips to provide an exterior crust when the strips are blanched or par-fried which may also retard oil adsorption into the potato strip. U.S. Pat. No. 5,620,727 concerns use of low molecular weight ionic hydrocolloid compositions to make film to reduce oil uptake. U.S. Pat. No. 3,687,688 concerns immersion of potato into a batter comprising sodium alginate for moisture control, and U.S. Pat. No. 4,900,573 concerns batter comprising hydroxypropyl methylcellulose which is said to function as an oil barrier.

Fat absorption/uptake of fried foods is one of the major concerns of consumers, particularly with respect to dietary concerns as fat provides approximately 9 calories. per gram to the food. Also, fat leaching from a prepared product during re-heating or reconstituting causes a greasy feel to food, and imparts undesirable organoleptic qualities to the food.

An object of the invention is a process that allows for the extrusion and processing of dough material comprising potato shreds to obtain an organoleptically acceptable and pleasing hand held convenience snack food, which can be easily reconstituted by the consumer, having a casing with axial cavities and savory fillings. These objects are achieved by the process and equipment described herein, particularly with regard to the moisture content of the dough material which enables extrusion without impairing the characteristics of the potato shred dough, the multiple extrusion nozzle and the cutting and crimping step of the process which isolates the savory filling material within the casing.

It is a further object of the invention to enable extrusion of a product having an outer casing with one or more axial indented ridge type connectors that allows sections of the casing to be broken apart so that the product can be consumed individually. A further object of the invention is the filling of the axial cavities simultaneously with extrusion. These, and other objectives of the invention, are achieved by the process and apparatus described herein.

Other objects of the invention are to make a hand held convenience snack food product that comprises a casing with potato shreds that can be extruded in the multiple extrusion nozzle and filled and then cooked, such as partially or fully fried or baked, without significant excess oil absorption during cooking and without oil or fat leaching during reconstitution and an extrudable casing comprising potato shreds that has structural integrity which can withstand the extrusion and filling process, and other processing to, in certain embodiments, axially join outer walls of two or more casings. These objectives are achieved by the unique potato shred matrix of the casing and the selection of cellulose gums which, with starch, forms a film on the exposed surfaces of the casing filling the voids in the potato shred matrix on exposed surfaces, which strengthens the matrix and inhibits oil/moisture transmission. These objectives are further achieved by the incorporation of axial indented ridge type connectors.

The process provides for an extruded baked or fried product comprising potato shreds wherein the integrity of the shreds is maintained despite the extrusion process. The cellulose gums and starch form a film around the exposed surfaces of the potato shred casing filling the voids at the exposed surfaces of the casing. As such, the casing maintains its shape during and after extrusion and the film helps control both oil pick-up during cooking and oil or fat leaching when the product is reconstituted. The moisture content is also important to processability as the moisture content of the casing, about 55% to about 75%, preferably about 60% to about 72%, regulates oil uptake during cooking in addition to facilitating extrusion.

In the present Specification, all parts and percentages are by weight/weight unless otherwise specified.

SUMMARY OF THE INVENTION

The process for making the snack food products comprises several steps. In general, the hand held and convenience snack products are formed from continuous ropes (referred to herein interchangeably as casings, ropes and continuous ropes), that are either hollow or solid. In the preferred embodiment, the casing is hollow and extruded through a multiple extrusion nozzle which provides for a casing having two or more inner walls, an outer wall and two or more axial cavities, such as two or three axial cavities defined by the inner walls, which. can be filled with a variety of savory fillings, such as meats, cheeses, or other processed dairy products, flavorings, spices, sauces and the like, or combinations of these. The casings are formed with axial indented ridge type connectors and can be radially cut to a lengthwise size to accommodate reconstitution, e.g., re-heating, in a conventional residential toaster or toaster oven. When the casing is cut, the casing is crimped to form ends of potato shred casing material which seals the filling within the axial cavities and the ends. In yet another embodiment of the invention, two or more ropes can be axially attached after extrusion. The details of the process and the various steps are discussed herein.

The casings comprise potato shreds which can be fresh cut or dehydrated, or a combination of fresh cut and dehydrated. The casing further comprises cellulose gum and starch, preferably modified starch, which form a film and fill voids in the potato shred matrix at the exposed surfaces of the casing, and serves to facilitate a stable potato shred matrix and provides a fat/moisture barrier for the casing material. Cellulose gums useful for the casing are microcrystalline cellulose, methylcellulose, carboxymethylcellulose, hydroxyethylcellulose, hydroxypropylcellulose, hydroxypropylmethylcellulose or combinations thereof. The matrix is critical to the mechanical properties of the product and, together with the moisture content of the extruded casing, allows for extrusion of the casing with sufficient structural support, particularly when the casing is extruded having one or more axial cavities so that the casing material will not generally collapse into the axial cavities. The film regulates moisture loss during frying to control fat uptake, and also retards fat from leaching from the product during reconstitution. The snack food product can be reconstituted by a number of means, including oven cooking, microwave cooking and heating in a conventional residential toaster or toaster oven. Leaching of fat during preparation would result in a greasy texture to the outer surface of the casing and poor organoleptic qualities. Thus, the matrix and film formed by the interaction of the gum and starch and potato shreds provide for an organoleptically acceptable product with a hash brown like texture and, particularly in the methods of toaster or toaster oven preparation, a product that will not undesirably leach oil or fat during re-heating or reconstitution.

The casing can comprise dehydrated potato shreds, fresh cut potato shreds or combinations thereof. When dehydrated potato shreds are used, the casing comprises about 20% to about 24% dehydrated potato shreds, about 3% to about 10% dried potato flakes, about 1% to about 4% starch, about 0.5% to about 2% flavorings, about 0.5% to about 2% sweetener, preferably dextrose, about 0.5% to about 2.5% cellulose gum and about 55% to about 75% water, preferably about 60% to about 72%. When fresh cut potato shreds are used, the casing comprises about 75% to about 95% fresh cut potato shreds, which may be moisture adjusted (e.g. dehydrated) to a moisture content of about 55% to about 75%, preferably about 60% to about 72%, about 3% to about 10% dried potato flakes, about 1% to about 4% starch, about 0.5% to about 2% flavorings, about 0.5% to about 2% sweetener, preferably dextrose, and about 0.5% to about 2.5% cellulose gum. Potato shreds as discussed herein are rectangular shaped potato pieces of random axial length, preferably up to about 76 millimeters, and a cross section of from about 6.4 millimeters to about 2.5 millimeters by about 3.2 millimeters to about 6.4 millimeters, preferably about 4.0 millimeters to about 2.5 millimeters by about 4.8 millimeters, and may be in dehydrated form.

The ingredients of the casing are mixed together and then the mixture is extruded through a multiple extrusion nozzle or a series of multiple extrusion nozzles to obtain one, or two or more cylindrically to elliptically shaped casings in the form of continuous ropes. In a preferred embodiment of the invention, the casing is extruded in hollow form, (i.e. tube like, having two or more axial cavities) and then filling is either co-extruded with the casing, injected into the axial cavities or stuffed into the axial cavities. The ropes are extruded through a multiple extrusion nozzle that provides for two or more axial cavities, preferably two or three axial cavities. Continuous ropes comprising a plurality of axial cavities can be extruded with axial intended ridge type connectors having radial widths of about 2 to about 12 millimeters formed at the outer surface of the casing material in the region between the axial cavities. The region between the axial cavities being the area of the extruded casing where the casing material is solid without the gap in casing material defined by an axial cavity.

The multiple extrusion nozzle comprises an outer extrusion segment and an inner extrusion segment which is inserted within the outer extrusion segment to enable extrusion of casing material with two or more axial cavities. Dough, preferably dough comprising potato shreds, is extruded through the annular space formed by the inside wall of the outer extrusion port of the outer extrusion segment and the outside wall of the inner extrusion port of the inner extrusion segment, thereby forming a potato shred casing having two or more axial cavities, such as two or three axial cavities. The savory filling materials are extruded, injected, or stuffed into the axial cavities through the inner extrusion segment. The multiple extrusion nozzle also forms a plurality of axial indented ridge type connectors by indentations in the outer extrusion segment. The multiple extrusion nozzle can also be used to extrude bakery dough comprising grain and/or flour.

If a snack food product comprising more axial cavities than are extruded in the casings is desired, a plurality of continuous ropes can be extruded on a conveyor. As the continuous ropes move on the conveyor, the continuous ropes physically move together, either through the movement of the conveyor or by physical means such as guides or wedges, and become connected at adjacent axial portions of outer walls of the casings to form a tube shaped snack food comprising two or more axially connected continuous ropes. By way of example and not limitation, casings each comprising two filled axial cavities can be attached lengthwise to form a set of attached casings comprising four axial cavities. An axial indented ridge type connector having a radial width of about 2 to about 12 millimeters is formed along adjacent outer walls of the axially connected continuous ropes. This axial indented ridge type connector is in addition to those formed within the continuous ropes during extrusion. The axial indented ridge type connectors provide the product with pull apart functionality, and adds rigidity to the casing of the overall product.

If the continuous ropes are not of a desired size or shape after extrusion, the continuous ropes may be subjected to a roll over operation which involves moving the continuous ropes under one or more rollers that compress the continuous ropes as desired. The ropes are cut radially to a desired length, to accommodate the method of preparation and size of equipment, (e.g. oven, microwave oven, toaster, etc.) for reconstitution, and the ropes are crimped at the time they are cut to form ends of potato shred casing material which seals the filling within the axial cavities and ends.

The cutting and crimping of the continuous ropes results in uncooked cut casings which are then cooked by frying or baking, including par-frying or par-baking and then frozen. The product can be reconstituted or reheated by means, such as a toaster, toaster oven or oven, or by microwave heating. The gum and starch provide a film around the casing which in part, inhibits the leaching of oil from the product during reconstitution thereby providing the product with acceptable organoleptic properties and texture, and reduced undesired greasy feel and, thus, the product has particular utility for hand held consumption. The gum and film also serves to enhance the structural support of the casing.

The process allows significant variation in product dimensions, particularly axial length, to accommodate differences in equipment sizes for re-heating and for future modifications by equipment manufacturers. The ability to vary the size of the product also allows for products to meet particular consumer choices. For example, the product can be cut to an axial length of about 8.5 centimeters to about 11 centimeters for current conventional toasters or toaster ovens, or could be cut longer for oven preparation or smaller to make a single serving pieces or hors d'oeuvres. The thickness is determined by some or all of the following: 1) the extrusion parameters, 2) the roll over operation and 3) the outer extrusion port of the multiple extrusion nozzle. The length is determined by cutting. The width is a function of 1) the size of the continuous ropes and 2) the number of continuous ropes axially attached together.

DETAILED DESCRIPTION OF THE INVENTION

The process provides for a tubular hand held convenience snack food product comprising a potato shred dough casing material that is extruded, preferably with axial cavities that are filled with a variety of savory fillings. The process generally involves the following steps.

1. Formulating dough having a moisture content of about 55% to about 75%, preferably about 60% to about 72%, which comprises potato shreds, either fresh cut and/or dehydrated, cellulose gum, starch and other dry ingredients.
2. Extruding the dough, preferably through a multiple extrusion nozzle which forms a continuous rope having two or more axial cavities and filling the axial cavities with savory filling materials by extrusion, injection, stuffing or otherwise through the multiple extrusion nozzle.
3. Optionally, compressing the continuous ropes through a roll over operation.
4. Cutting and crimping the continuous ropes, preferably to a size of about 8.5 centimeters to about 11 centimeters, to obtain uncooked cut casings having filling material generally sealed within the axial cavities and ends.
5. Cooking the uncooked cut casings by frying, parfrying, baking and/or par baking to obtain a product.
6. Freezing the product.

Figure 1:
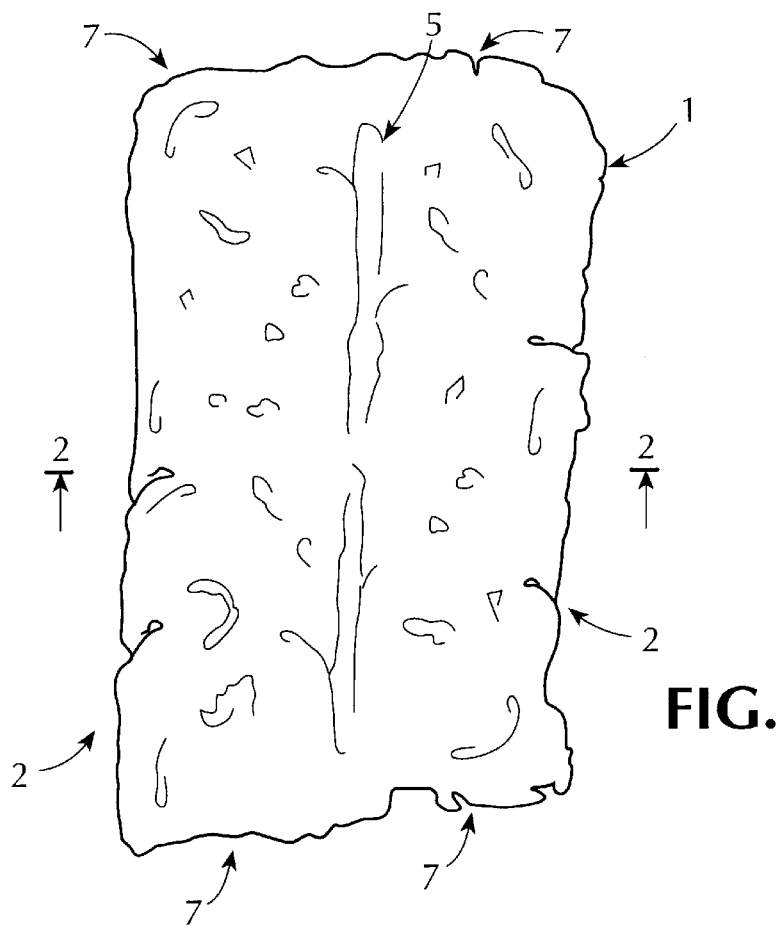
FIG. 1 is a top view elevation of the hand held snack food product in an embodiment where a continuous rope having two filled axial cavities is cut and crimped for toaster or toaster oven preparation.
Figure 2:
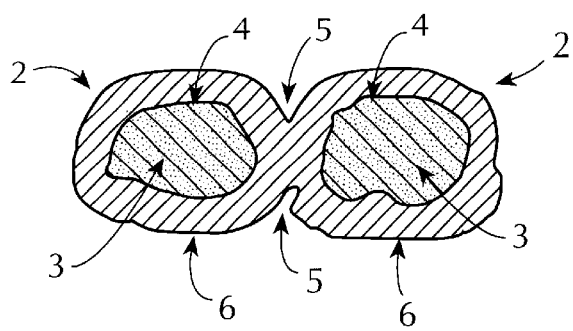
FIG. 2 is a cross sectioned view along line 2—2 of FIG. 1.
Figure 3:
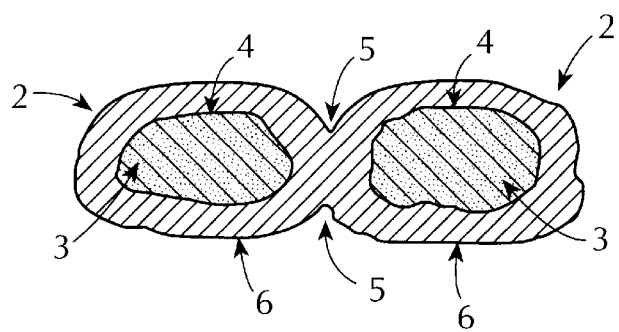
FIG. 3 is a cross sectioned view of a continuous rope having two filled axial cavities.
Figure 4:
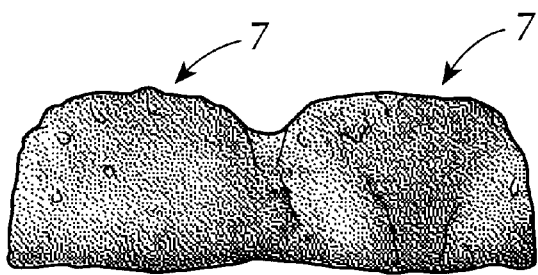
FIG. 4 is an end view elevation of the hand held snack food product in an embodiment where a continuous rope having two axial cavities is cut and crimped for toaster or toaster oven preparation.

The hand held snack foods are a convenience food product designed to move from the package to serving with merely reconstitution, such as re-heating, by the consumer. Referring to FIGS. 1–4, the hand held snack food product 1 is generally depicted in FIG. 1. The product comprises a dual cylindrical shaped casing (continuous ropes) 2 and filling 3 in axial cavities defined by inner walls 4 of the casing 2 as shown in FIGS. 2 and 3. An axial indented ridge type connector 5 is formed lengthwise in the top and bottom of the outer surface of the potato casing in the region of solid casing material between regions of hollow casing (e.g. at the locations of the axial cavities) as shown in FIGS. 1–3. It is to be understood that while FIGS. 1–3 show a product where two axial cavities are formed together with an axial indented ridge type connector 5, continuous ropes, hollow and filled or solid, can have any number of axial cavities with lengthwise axial indented ridge type connectors. In embodiments of invention having three axial cavities, for example, the product would have two axial indented ridge type connectors. Generally, the number of axial indented ridge type connectors will be one less than the number of axial cavities. When the product is cut and crimped, the product comprises at least one end 7 as shown in FIGS. 1 and 4; of casing material which encloses the filling within the inner walls 4 of the casing and ends 7 forming uncooked cut casings wherein the filling is generally isolated within potato shred casing material.

The continuous ropes are extruded through a multiple extrusion nozzle which extrudes casing having two or more axial cavities, preferably two or three axial cavities, and the axial cavities are filled by extrusion, injection or stuffing of savory fillings through the multiple extrusion nozzle. The nozzle can be adapted to fit standard commercial food extruders, such as co-extruders available from Rheon, USA, Huntersville, N.C., USA, and non-traditional extrusion equipment such as continuous vacuum stuffers, pumperstuffer equipment and other modified co-extrusion equipment.

Figure 11:
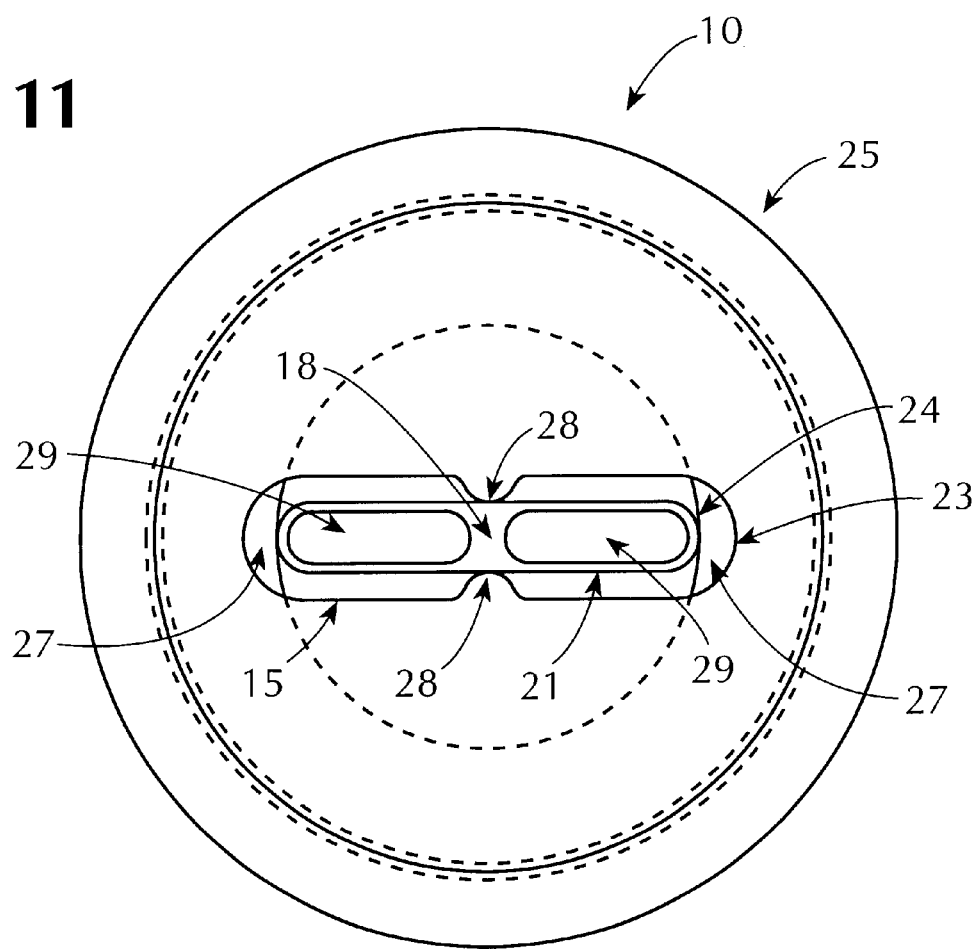
FIG. 11 is a front view elevation of the multiple extrusion nozzle having an inner extrusion segment inserted within the outer extrusion segment in an embodiment where two axial cavities are formed by extrusion.
Figure 17:
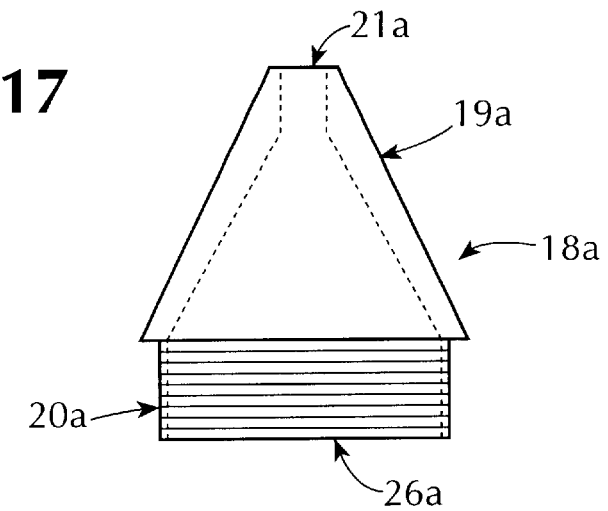
FIG. 17 is a side view elevation of the inner extrusion segment in an embodiment where three axial cavities are formed by extrusion.
Figure 18:
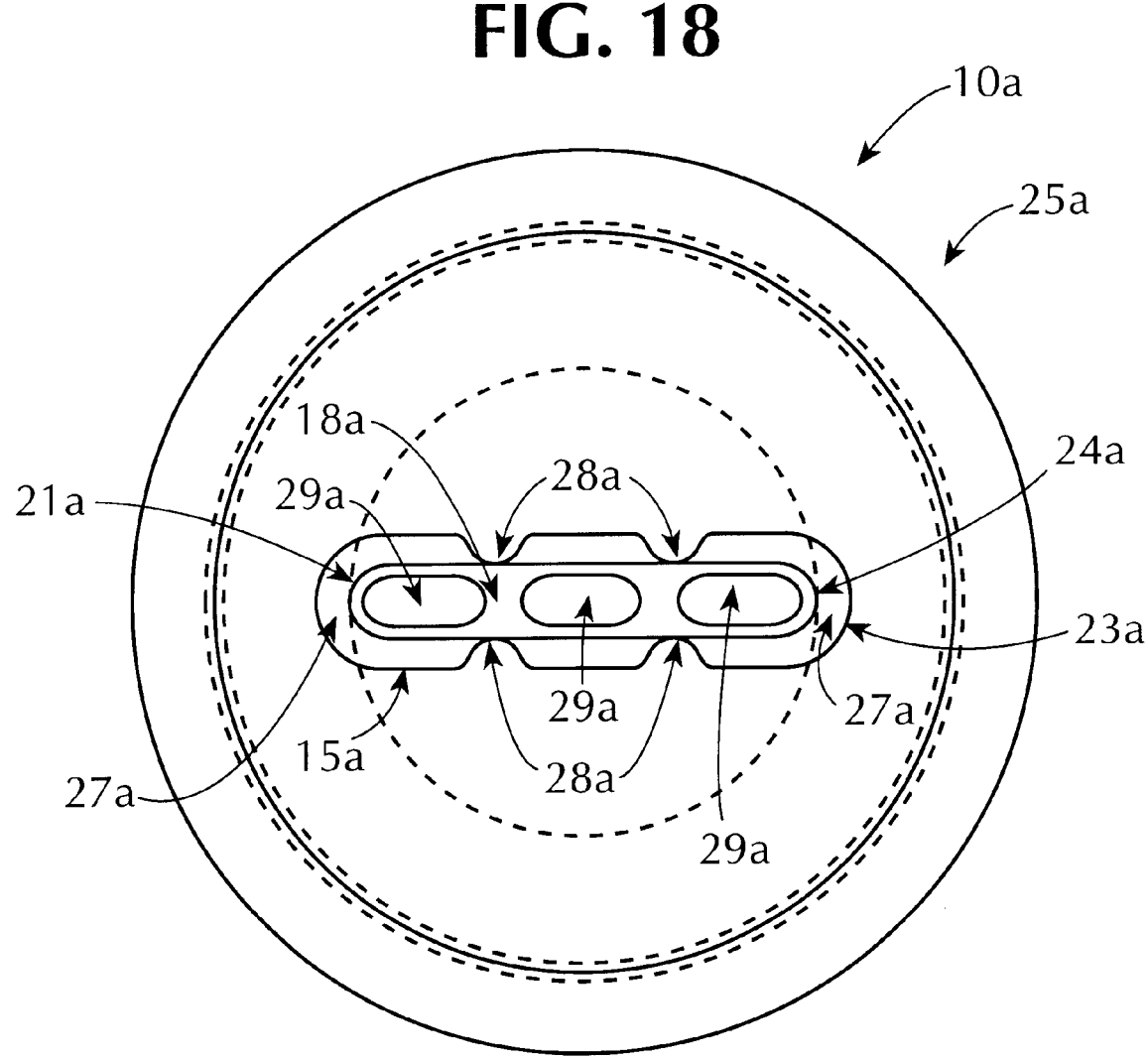
FIG. 18 is a front view elevation of the multiple extrusion nozzle having an inner extrusion segment inserted within the outer extrusion segment in an embodiment where three axial cavities are formed by extrusion.

The multiple extrusion nozzle is illustrated in FIGS. 5–18 with respect to embodiments where continuous ropes comprising two and three axial cavities are extruded. The multiple extrusion nozzle, as shown in FIGS. 11 and 18, comprise an outer extrusion segment 10 and 10a and an inner extrusion segment 18 and 18a. Dough, preferably dough comprising potato shreds as described herein, is extruded through the annular space 27 and 27a to form a continuous rope having axial cavities, and the axial cavities are filled through the inner port openings 29 and 29a of the inner extrusion ports 21 and 21a of the inner extrusion segment 18 and 18a. Indentations 28 and 28a form the axial indented ridge type connectors 5 as shown in FIGS. 1–3. The filled casings are cut and processed as described herein to form the snack food product 1 as shown in FIGS. 1–4.

Figure 5:
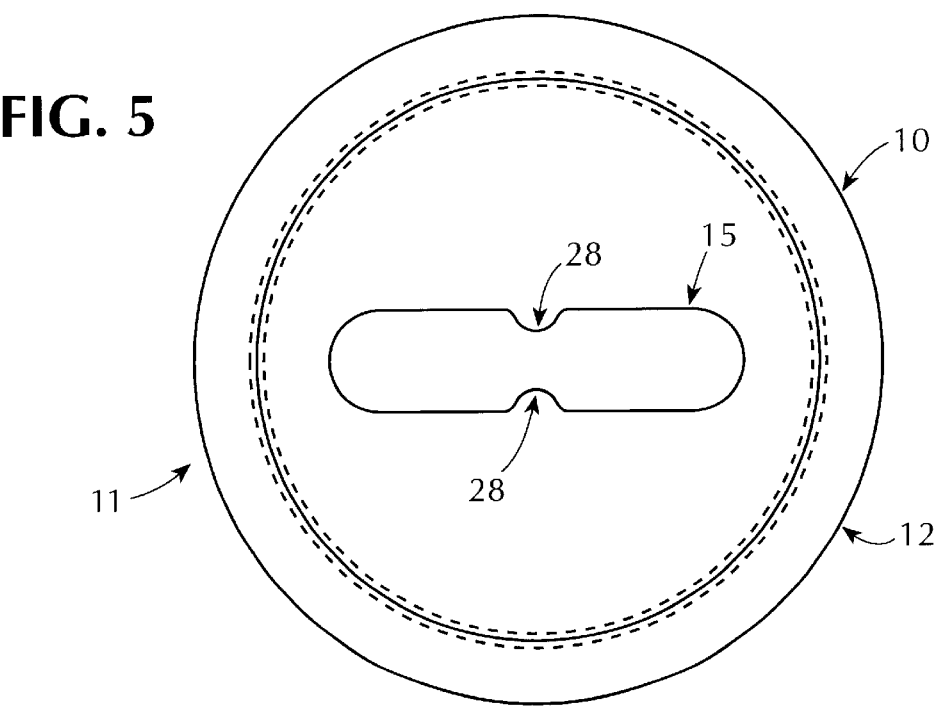
FIG. 5 is a front view elevation of the outer extrusion segment in an embodiment where two axial cavities are formed by extrusion.
Figure 6:
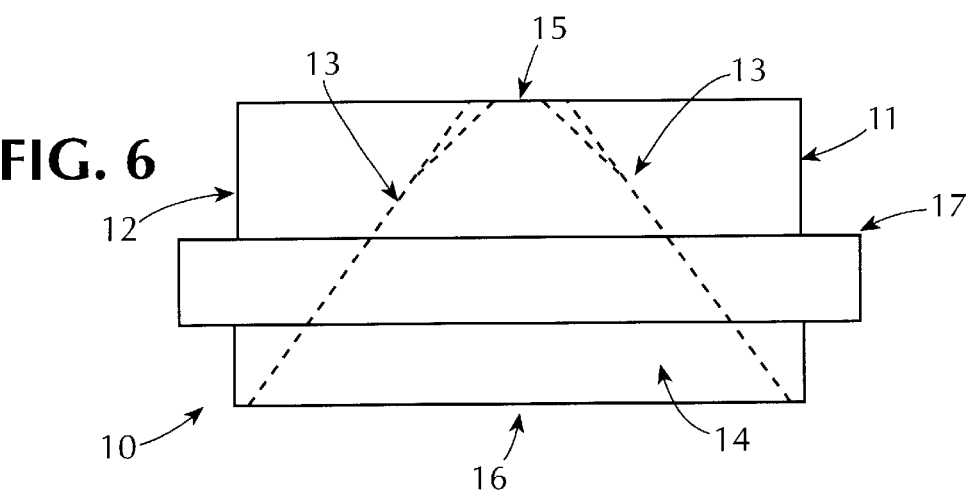
FIG. 6 is a side view elevation of the outer extrusion segment in an embodiment where two axial cavities are formed by extrusion.
Figure 7:
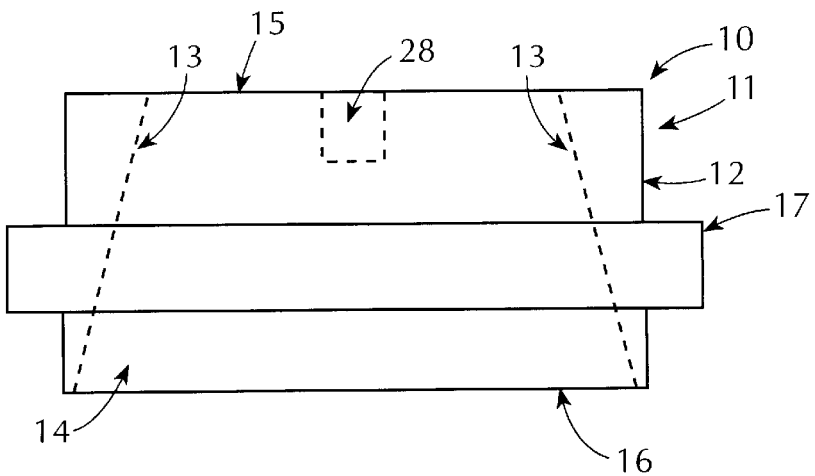
FIG. 7 is a top view elevation of the outer extrusion segment in an embodiment where two axial cavities are formed by extrusion.

The outer extrusion segment 10 is shown generally in FIGS. 5–7. Referring to FIGS. 5–7, the outer extrusion segment 10 comprises a body 11 which has an outer surface 12 and an inner surface 13, preferably conical shaped, which forms a hollow section 14, preferably conical shaped, defined by the inner surface 13 that terminates at one end with an outer extrusion port 15 and at the opposite end in an opening 16. The outer extrusion port 15 may be any shape, but is preferably shaped as a modified ellipse as shown in FIGS. 5–7 and FIG. 11. Generally, the outer extrusion port 15 is smaller in dimension than the opening 16, and dough, preferably dough comprising potato shreds, enters the opening 16 from the extruder and flows through the hollow section 14 to the outer extrusion port 15 from which the dough is extruded.

At least one set of indentations 28 are formed in the inner surface 13 adjacent to and extending to the outer extrusion port 15. The separate indentations of each set 28 are positioned opposite to each other in an upper and lower orientation and form the axial indented ridge type connectors in the outer surface of the casings.

A protruding flange 17 which protrudes radially from the outer surface 12 is formed on the body 11, functions as a means to secure the outer extrusion segment 10 to a co-extruder. Generally, the flange is seated within an outlet of the co-extruder and a threaded hollow cap (not shown) having a means for sealing the fastening connection, such as a gasket or o-ring, mates with the threaded outer surface of outlet to secure the outer extrusion segment to the co-extruder.

Figure 8:
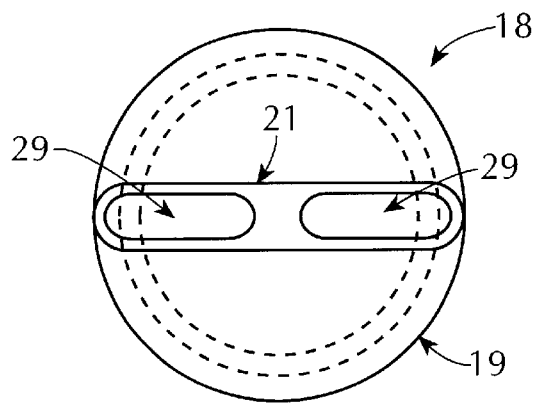
FIG. 8 is a front view elevation of the inner extrusion segment in an embodiment where two axial cavities are formed by extrusion.
Figure 9:
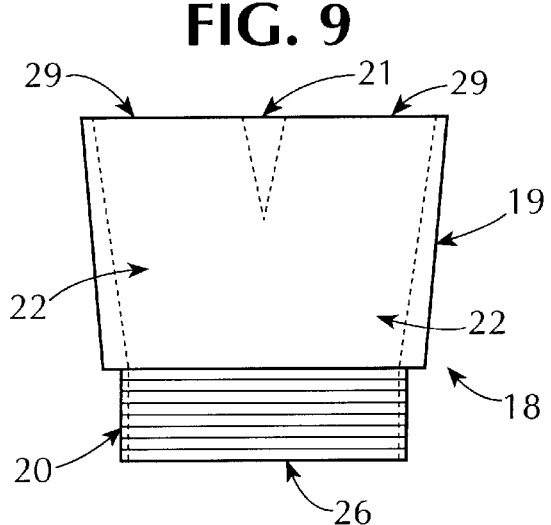
FIG. 9 is a top view elevation of the inner extrusion segment in an embodiment where two axial cavities are formed by extrusion.
Figure 10:
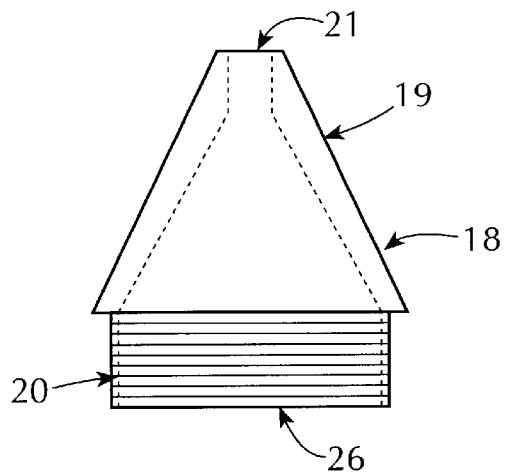
FIG. 10 is a side view elevation of the inner extrusion segment in an embodiment where two axial cavities are formed by extrusion.
Figure 12:
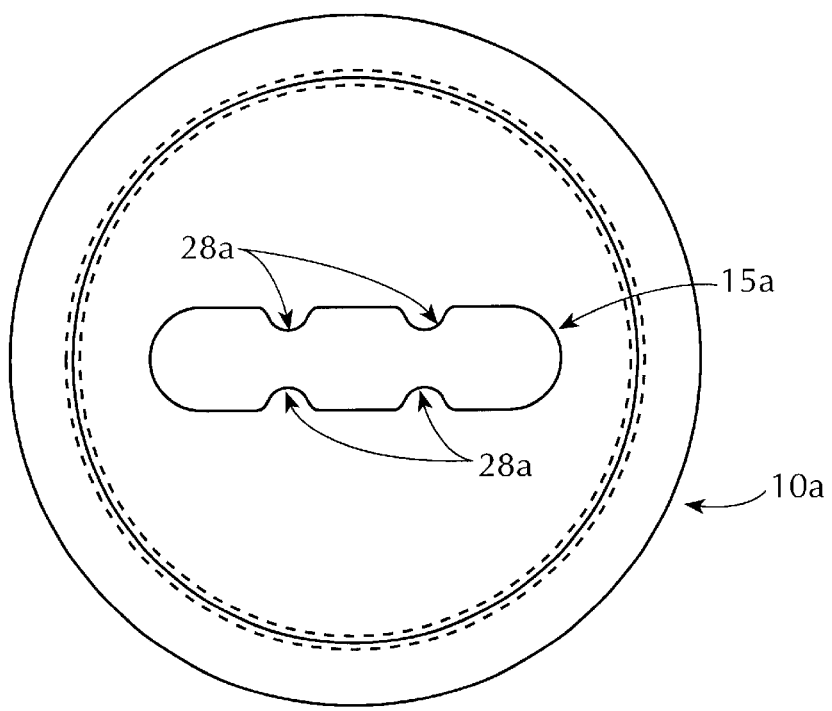
FIG. 12 is a front view elevation of the outer extrusion segment in an embodiment where three axial cavities are formed by extrusion.
Figure 13:
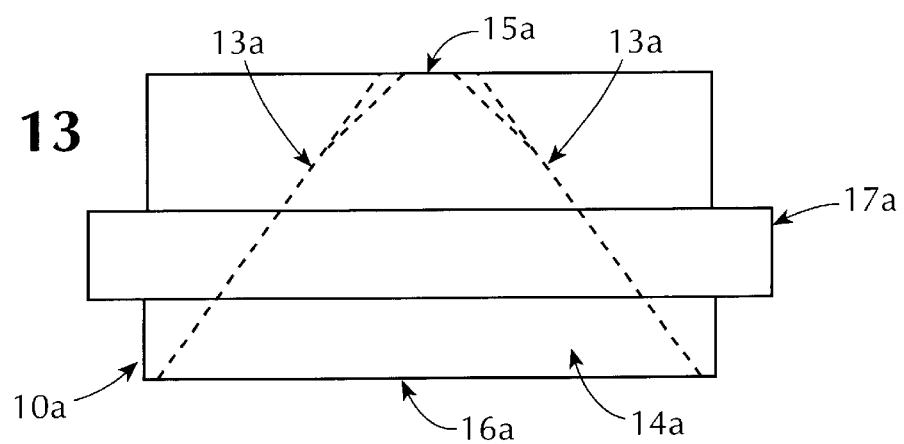
FIG. 13 is a side view elevation of the outer extrusion segment in an embodiment where three axial cavities are formed by extrusion.
Figure 14:
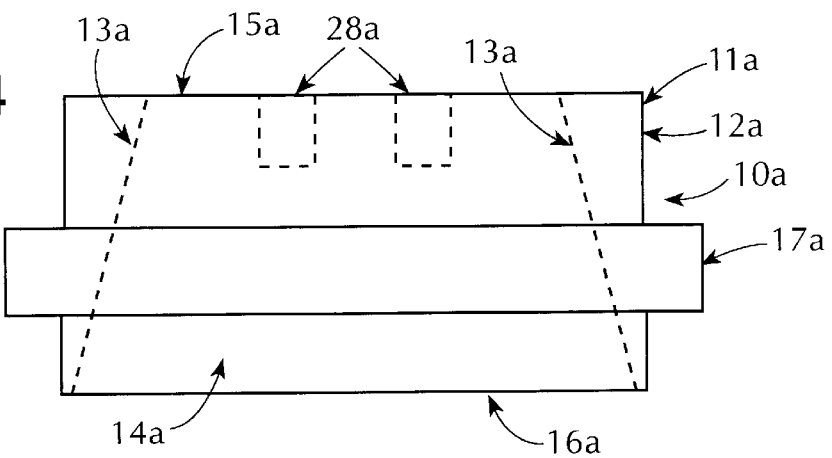
FIG. 14 is a top view elevation of the outer extrusion segment in an embodiment where three axial cavities are formed by extrusion.
Figure 15:
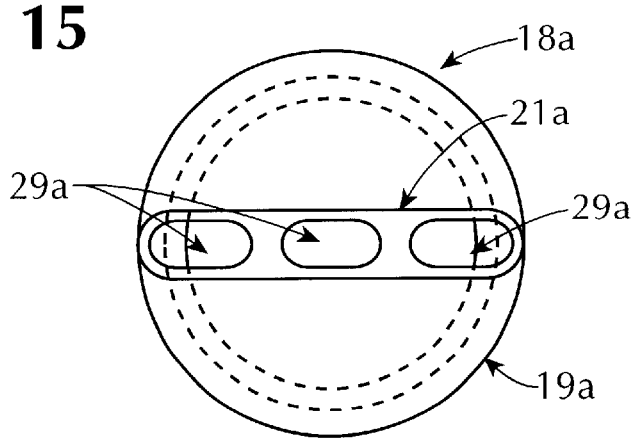
FIG. 15 is a front view elevation of the inner extrusion segment in an embodiment where three axial cavities are formed by extrusion.
Figure 16:
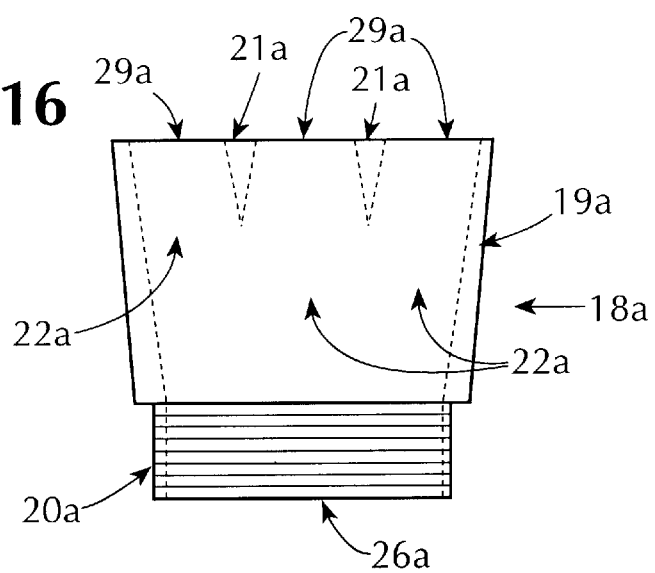
FIG. 16 is a top view elevation of the inner extrusion segment in an embodiment where three axial cavities are formed by extrusion.

Referring again to FIGS. 5–7 and also to FIG. 11, dough, such as dough comprising potato shreds, can be extruded through the outer extrusion port 15 to form a solid shaped article which can then be further processed as described herein. In the preferred embodiment of the invention, however, the multiple extrusion nozzle provides for extrusion of two or more axial cavities. In an embodiment of the invention providing for a product having two axial cavities shown in FIG. 11, an inner extrusion segment 18 (as shown in FIGS. 8–10) is used in conjunction with the outer extrusion segment 10 to form the multiple extrusion nozzle 25. In an embodiment of the invention providing for a product having three axial cavities, as shown in FIG. 18, an inner extrusion segment 18a (as shown in FIGS. 15–17) is used in conjunction with the outer extrusion segment 10a (as shown in FIGS. 12–14) to form the multiple extrusion nozzle 25a. The multiple extrusion nozzle 25 (25a), namely the outer extrusion segment 10 (10a) and inner extrusion segment 18 (18a), can be made of any material appropriate or permitted for food processing such as plastics, ceramics, stainless steel or any other food grade material and the separate components of a particular multiple extrusion nozzle 25 (25a) can be made from different materials provided each material is acceptable for food processing.

The inner extrusion segment 18 is shown generally in FIGS. 8–10 with respect to the embodiments providing for two axial cavities. Referring to FIGS. 8–10, the inner extrusion segment 18 comprises a shaped body 19 having on one end a threaded section 20, which threadably mates with a co-extruder, and at the other end at least one inner extrusion port 21 having at least two, preferably two or three inner port openings 29. The material of the inner extrusion port 21 between the inner port openings 29 can be of any thickness not exceeding the dimension of the inner extrusion port 21 in the area of the inner port openings 29. The shaped body 19 will comprise at least one, preferably two or three, channels 22 for material flow. FIGS. 8–11 illustrate an embodiment of the invention where the inner extrusion segment comprises two separated, inner channels 22 for extruding an article with two axial cavities. The channels 22 are hollow having diverging axes which are interspaced between the threaded section and inner extrusion port 21 and the channels are aligned with the inner port openings 29 of the inner extrusion port 21. The channels 22 may have any axial length between the threaded section and inner extrusion port 21, e.g. a single channel may exist at the threaded section which then splits into separate channels prior to the inner extrusion port 21 or the channels may originate at or near the threaded section 20. While FIGS. 8–11 show an embodiment of the multiple extrusion nozzle 25 adapted for making an article having two axial cavities, it should be understood that the number of axial cavities will be a function of the number of channels 22 and inner port openings 29 of the inner extrusion segment 18.

The multiple extrusion nozzle comprises the outer extrusion segment 10 with the inner extrusion segment 18 inserted into the hollow section 14. The outer extrusion segment 10 and inner extrusion segment 18 are radially aligned. As shown in FIG. 11 with respect to the embodiment of the invention wherein the multiple extrusion nozzle is adapted for two axial cavities, the inner extrusion port 21 is interspaced within the outer extrusion port 15, thus forming an annular space 27 between the outside wall 24 of the inner extrusion port 21 and the inside wall 23 of the outer extrusion port 15. The outer extrusion port 15 and inner extrusion port 21 are generally flush with respect to each other, i.e. their open ends are in the same plane, however, there may be a small amount of clearance between the inner extrusion port 21 and outer extrusion port 15 to allow the dough to completely surround the axial cavities and form the inner walls of the casing material before the casing material exits the multiple extrusion nozzle and this clearance is created by moving the open end of the inner extrusion port 21 relative to the open end of the outer extrusion port 15 so that they open into separate parallel planes. In other words the open end of the inner extrusion port 21 can extend beyond the plane defined by the open end of the outer extrusion port 15 or the open end of the outer extrusion port 15 can extend beyond by the open end of the inner extrusion port 21.

As discussed herein, the multiple extrusion nozzle and component parts can be modified to accommodate extrusion of continuous ropes having a plurality of axial cavities. FIGS. 12–18 illustrate an embodiment of the multiple extrusion nozzle and component parts for extrusion with three axial cavities. The component parts illustrated in FIGS. 12–18 numbered 10a to 29a correspond to the component parts described herein and illustrated in FIGS. 8–11 with respect to extrusion with two axial cavities. The multiple extrusion nozzle providing for three axial cavities functions in the same manner and can be secured to a co-extruder in the same manner as described herein with respect to the invention in general and the embodiment whereby two axial cavities are formed.

Referring to FIGS. 5–18, dough, preferably dough comprising potato shreds, moves through the inner section 14 (14a) of the outer extrusion segment 10 (10a) to the outer extrusion port 15 (15a) from which the dough moves through the annular space 27 (27a) from the multiple extrusion nozzle thus forming a casing comprising two or more axial cavities. The inner extrusion segment 18 (18a) is placed into the inner section 14 (14a) and forms the axial cavity in the casing material by creating the annular space 27 (27a) within the outer extrusion port 15 (15a). Filling material is either extruded, injected or stuffed into the axial cavities through the inner port openings 29 (29a) of the inner extrusion port or ports 21 (21a).

By way of example, the multiple extrusion nozzle 25 (25a) can be incorporated into a commercially available extruder as follows. The inner extrusion segment 18 (18a) can be attached by threaded means to the inner flow of a dual zone extruder, or material supply means, such as pipes or tubes and thereby secured to a supply of filling material. The outer extrusion segment 10 (10a) is then attached to the extruder at the protruding flange 17 (17a) by securing means, such as a locking mechanism like the hollow cap described herein or by fasteners or the like such that the inner extrusion segment 18 (18a) is placed within the hollow section 14 (14a) of the outer extrusion segment 10 (10a). This arrangement is generally shown in FIG. 11 with respect to an inner extrusion segment 18 having two channels 22 and two inner port openings 29 of the inner extrusion port 21, and FIG. 18 with respect to an inner extrusion segment 18a having three channels 22a and three inner port openings 29a of the inner extrusion ports 21a.

Sets of indentations 28 (28a) on the inner surface 13 (13a) form the axial indented ridge type connectors for the snack food product. The sets of indentations, which may be a small pieces of material, such as plastic or metal, is generally molded into or affixed to the inner surface by fastening means to accommodate extrusion of the casing material having any number of axial cavities. FIGS. 5–7 and 11 illustrate an embodiment where the outer extrusion segment 10 comprises one set of indentations located in the top and bottom of the area of the inner surface 13 between corresponding channels 22 and inner port openings 29 of the inner extrusion segment 18. FIGS. 12–14 and 18 illustrate an embodiment where the outer extrusion segment 10*a* comprises two sets of indentations located in the top and bottom of the area of the inner surface 13*a* between corresponding channels 22*a* and inner port openings 29*a* of the inner extrusion segment 18*a*. In general, the number of indentations will be one less than the number of channels of the inner extrusion segment, and will be located in the top and bottom of the inner surface between corresponding adjacent channels of the inner extrusion segment.

The axial indented ridge type connector as shown in FIGS. 1–3 preferably has a radial width of about 2 to about 12 millimeters. The axial indented ridge type connector allows the casings to be broken or split apart lengthwise without the aid of any utensils or tools. The product breaks at the axial indented ridge type connector without breaking the walls of the casing at the area of the axial cavities, (e.g. without breaching the axial cavities) and exposing filling or impairing the basic structure of the casings. Thus, the product can be broken down to serving sizes without the risk of filling escaping out from the casing during reconstitution and/or consumption. Accordingly, the product can be a hand held convenience food product.

The product comprises potato shreds and has a casing comprising potato shreds, cellulose gum, starch, and savory fillings which can be any variety of dairy or meat based substances, such as meat, cheeses or other processed dairy foods, flavorings, sauces, spices and the like, and combinations of these. The potato shreds have random length, preferably up to about 76 millimeters, and a cross section of from about 6.4 millimeters to about 2.5 millimeters by about 3.2 millimeters to about 6.4 millimeters, preferably about 4.0 millimeters to about 2.5 millimeters by about 4.8 millimeters.

The moisture content of the casing is important for extrusion of the potato shred and for the properties of the cooked product. A moisture content of between about 55% and about 75%, preferably about 60% to about 72%, provides sufficient moisture to form a flowable potato shred dough. Thus, for example, the dough can be extruded in a dual cylindrical shape in either solid form or with one or two axial cavities, without significant damage to the particulate structure of the potato and without impairment of the organoleptic characteristics of the potato shreds. If the moisture content is too low, the casing dough, including the potato shreds will tend to swell during extrusion creating difficulties with the extrusion, such as significant breakdown or destruction of the shred and individual potato particles so that the shreds lose their character, texture and organoleptic qualities. One skilled in the art would appreciate that extrusion of the casing with a plurality of axial cavities enhances the difficulty in extrusion of dough comprising potato shreds as the annular space for flow-through of casing material is of decreased size compared to extrusion of a solid rope. Low moisture content will also cause discontinuities in the outer surface of the casing and potato shred matrix and insufficient formation of the film or filling of the void spaces in the matrix on the exposed surfaces of the casing by the gum and starch which can result in undesired product properties, including appearance, taste, organoleptic characteristics and undesired oil uptake during cooking, and leaching during reconstitution. If the moisture content is too high, uncooked casings, such as uncooked cut casings, will take up a greater amount of fat during frying because repelled moisture during cooking is replaced with fat, thus resulting in poor organoleptic qualities and texture and undesired greasy feel and taste of the product after reconstitution. Accordingly, the moisture content regulates fat uptake.

The casing can be made with either fresh cut potato shreds or dehydrated potato shreds or combinations thereof. Fresh cut shreds are made from fresh potatoes which are comminuted by conventional means such as ricing, cutting, grinding or milling, and then the comminuted particles are sieved to obtain the desired size. Dehydrated potato shreds may be fresh cut dehydrated pieces. Fresh cut and dehydrated potato shreds are available from Nonpareil Co., Blackfoot, Id., U.S.A. The source or type of shred is not critical to the invention. The casing also comprises dried potato flakes which can be in the form of granulated, mashed or other processed potatoes and potato pieces.

When de-hydrated potato shreds are used, the casing comprises about 20% to about 24% dehydrated potato shreds, about 3% to about 10% dried potato flakes, about 1% to about 4% starch, preferably modified starch, about 0.5% to about 2% flavorings, about 0.5% to about 2% sweetener, preferably dextrose, about 0.5% to about 2.5% cellulose gum and about 55% to about 75% water, preferably about 60% to about 72% water. When fresh cut potato shreds are used, the casing comprises about 75% to about 95% fresh cut potato shreds, which may be adjusted (e.g. partially dehydrated) to a moisture content of about 55% to about 75%, preferably about 60% to about 72%; about 3% to about 10% dried potato flakes, about 1% to about 4% starch, preferably modified starch, about 0.5% to about 2% flavorings, about 0.5% to about 2% sweetener, preferably dextrose and about 0.5% to about 2.5% cellulose gum.

The dehydrated potato shreds and added water, or freshly cut shreds, are combined with the other ingredients to form a mixture. The mixture is then extruded through the multiple extrusion nozzle to form one, or two or more, continuous ropes of material each comprising two or more axial cavities, such as two or three axial cavities. The continuous ropes may be in the form of a casing material in cylindrical form as shown in FIGS. 1–4 having inner walls 4, an outer wall 6 and axial cavities defined by the inner walls 4, and the axial cavities may be filled with filling material 3. The multiple extrusion nozzle arrangement forms casing with two or more axial cavities and having a lengthwise axial indented ridge type connectors as shown in FIGS. 1–3. The ropes, which may be hollow and filled with savory filling are cut and crimped to form ends 7 of potato shred casing material as shown in FIGS. 1 and 4, which encloses the filling within the axial cavity and ends 7 forming uncooked cut casings. In a preferred embodiment, the ropes are cut into lengths to accommodate reconstitution by re-heating in current conventional residential toasters or toaster ovens. The dimensions of the product can vary by processing conditions to accommodate different sizes of equipment for re-heating and future size changes, and to provide different sized products for consumer choice.

The first step in the process of making the snack food product concerns preparation of the potato shreds for extrusion. When fresh cut shreds, or a combination of fresh cut shreds and dehydrated shreds are used, re-hydration may not be necessary provided the moisture content is sufficient to obtain a dough with a moisture content of between about 55% and about 75%. When dehydrated potato shreds are used, the shreds must be re-hydrated to obtain a dough having a moisture content of about 55% to about 75% prior to further processing. In either embodiment the preferred moisture content of the casing material prior to extrusion and cooking is between about 60% and about 72%. Dehydrated shreds are re-hydrated with water at a temperature of about 45° C. to about 95° C. for about 18 to about 60 minutes with, if needed, interval mixing of about 1 to about 1.5 minutes about every 3 to 5 minutes during the time period. Mixing can be performed in any vessel, including those capable of interval mixing, such as a standard paddle mixer available from Hobart Corporation, Troy, Ohio, U.S.A. or a ribbon type mixer. These mixers are understood in the art and require no further discussion.

The total mixing time and intervals for re-hydration of the dehydrated potato shreds is a function of the water temperature, and re-hydration of the shreds is possible at water temperatures less than about 45° C. or greater than about 95° C. When temperatures lower than about 45° C. are used for re-hydration, an acceptable casing is feasible, however the mixing and standing intervals are too great for making a product on a commercial basis, as the re-hydration process can take overnight or more than 24 hours. Water temperatures above about 95° C. will have an adverse effect on the potato shred.

After the dehydrated shreds are re-hydrated; or if fresh cut potato shreds are used, after the moisture content is adjusted to obtain a dough having a moisture content in the range of between about 55% and about 75%, preferably about 60% to about 72%; other dry ingredients can then combined with the potato shreds, although the other dry ingredients can be added during the re-hydration. Preferably, however, all or some of these other dry ingredients, such as dried potato flakes, starch, flavorings, (e.g. onion flakes or powder), sweetener, preferably dextrose, and cellulose gum, are added after re-hydration of dehydrated potato shreds to avoid competition for water between the shreds and other ingredients during the re-hydration which could affect complete hydration of the dehydrated potato shreds. The cellulose gum and/or flavorings, for example, can be combined and mixed with or dispersed in the water used for re-hydrating the potato shreds either prior to or during the re-hydration step, or the cellulose gum can be added with the other ingredients after re-hydration is complete.

After the other dry ingredients are combined with the re-hydrated potato shreds, the ingredients and shreds are mixed continuously for about 3 to about 5 minutes in a mixing vessel, such as a continuous mixer equipped with a dough hook, available from Hobart Corporation. After mixing, the potato shreds and other dry. ingredients are in the form of a dough having a moisture content of between about 55% and about 75%, preferably about 60% to about 72%, which can then be processed by extrusion to obtain the casing material. Prior to extrusion, the dough can sit at ambient temperature for an indefinite amount of time, however a period of up to about 1 hour is preferred for making an acceptable potato shred casing.

The potato shred dough is then extruded through the multiple extrusion nozzle or a series of such multiple extrusion nozzles, each of which also has means for placing the filling within the axial cavity of the casing material to form one, or two or more continuous ropes, each having two or more axial cavities. The nozzle can be used with a commercial co-extruder, such as Model Nos. KN300, KN400, CN100 and 207 from Rheon USA. The nozzle can also be used with non-traditional extrusion equipment such as continuous vacuum stuffers, pumper-stuffer equipment and other modified co-extrusion equipment. The filling is either stuffed or injected into the casing or co-extruded with the casing material through an inner extrusion segment.

The casing, or casing/filling as the case may be, is extruded in continuous ropes comprising two or more axial cavities onto a conveying system, such as a conveyor belt. In aspects of the invention where the snack food product comprises two or more continuous ropes, a plurality of continuous ropes are extruded onto the same conveying system. The plurality of continuous ropes are then attached on the conveying system by the orientation of the continuous ropes and forward movement of the conveyor and/or by physical means, such as the application of force by wedges and/or guides. The attached continuous ropes comprise axial indented ridge type connectors having a radial width of about 2 to about 12 millimeters between attached adjacent multiple continuous ropes, formed by the orientation of the ropes, in addition to the axial indented ridge type connectors formed during extrusion.

If the ropes are not of a desired size or shape after extrusion, the process can further comprise the step of adjusting the size or shape by a roll over operation. While on the conveyor, the continuous ropes or attached continuous ropes move beneath one or two or more stationary rollers which can be adjusted to obtain a desired thickness and shape of the casings. As the casings move on the conveyor under the roller or rollers, the casings are compressed.

The continuous ropes are cut to desired size and crimped on each end to seal each end with casing material thereby generally enclosing the filling material within the axial cavities and the ends to obtain uncooked cut casings. The cutting and crimping operation generally occurs after the roll over operation if this step is employed. The cutting and crimping of the product can occur simultaneously by cutting with a blade while the continuous ropes are moving along the conveying system. The actual dimensions of uncooked cut casings can be varied to accommodate a variety of means for reconstituting and heating the product, such as a conventional residential toaster or toaster oven. After the continuous ropes are cut and crimped, the uncooked casings are then cooked by being fried, baked, par-fried or par-baked to prepare the cooked product for freezing. The product can be fried, par-fried, baked or par-baked, in any frying or baking apparatus, non-limiting examples of which are a Pitco Frialator Model E14 from Pitco Frialator, Concord, N.H., USA for frying or par-frying or a Model UB-3T baking oven from NU-VU, Menominee, Mich., USA for baking or par-baking. Freezing may be done in any commercial type freezer, preferably in a blast type freezer, such as a Rinox Blast Chiller and Freezer available from Servolift Eastern Co., Boston, Mass., U.S.A.

During the cooking process, particularly when the uncooked cut casings are fried or par-fried, a certain amount of moisture from the casing material will be replaced with fat or oil, despite the gum/starch film that retards moisture loss. Generally, the casing material will experience a moisture loss during cooking of about 8% to about 15% and will experience about 6% to about 10% fat or oil uptake during cooking. The moisture content of the casing of the cooked product is about 45% to about 60%. Because moisture in the casing is replaced by oil, the moisture content of the casing regulates oil uptake as higher moisture content in the casing (e.g. more than about 75%) would result in greater amounts of moisture loss and oil uptake during cooking.

The axial indented ridge type connectors serve to provide the product with break apart functionality. The axial indented ridge type connectors also provide structural rigidity to the product.

The cellulose gum and starch, preferably modified starch, form a film around the casing and seals the potato shred matrix by filling the void spaces of the exposed surfaces of the casing which provides the casing with structural integrity. The gum also regulates fat uptake during frying, or cooking and inhibits fat from leaching during reconstitution. As set forth in Table I, inclusion of cellulose gum in amounts from 0.5% to 2.0% reduces fat uptake from between 16.5% and 27.0%, and the casing formula should include at least about 0.5% cellulose gum. The filling of the void spaces and film also retards oil from leaching from the product during reconstitution and provides for a crispier texture when the product is reconstituted, particularly by re-heating in a toaster or toaster oven. Preferred cellulose gums are microcrystalline cellulose, methylcellulose, carboxymethylcellulose, hydroxyethylcellulose, hydroxypropylcellulose, hydroxypropylmethylcellulose and combinations thereof. AVICEL® Type C-611F cellulose gel available from FMC Corporation, Philadelphia, Pa., USA can be used in the casing formula. The gum may be added in powder form with the other dry ingredients or dispersed in the water used to re-hydrate the dehydrated potato shreds. Physically or chemically modified starches are preferred because these types of starches impart better freeze thaw stability than native starches.

TABLE I

| Cellulose Gum (%, w/w in casing) | Fat uptake (%, casing) (fried at 375° F., 90 seconds) | % fat uptake reduction |
|---|---|---|
| 0 | 11.5 | reference |
| 0.5 | 9.6 | 16.5 |
| 1.0 | 8.8 | 23.5 |
| 2.0 | 8.4 | 27.0 |

Note:
the fat content of casing before fry is 0.1 to 0.15%

The tube shaped snack food product has an exterior surface texture reminiscent of processed hash brown potato patties. The potato shred matrix creates an irregular surface with shreds slightly protruding from the surface and the cellulose gum and starch seal the surface. This surface texture results in a hand held convenience snack food type product with visual appeal and organoleptically enhanced properties because of the textured surface.

The potato shreds having irregular and random sizes results in a cross linked potato shred matrix throughout the casing material. This cross linking enhances the structural integrity of the casing. The gum and starch seal the exposed surfaces of the casing material and fills the void space in the matrix at the exposed surfaces of the casing thus fixing the cross-linked shreds in the form of a matrix providing further product stability and sets the textured surface of the product. The matrix also provides a casing material with greater homogeneity-such that extrusion is facilitated and the casing material is devoid of undesirable gaps which affect product appearance and the potential for filling material to escape from the casing during extrusion and processing or when the finished product is reconstituted.

EXAMPLES

Example I

Dehydrated potato shreds having an average cross section of about 2.5 millimeters by about 4.8 millimeters, with random length, were re-hydrated with water at 75° C. in a Hobart 80 quart mixer for a total time of 35 minutes with interval mixing of 1.5 minutes at speed 1 every 5 minutes. After re-hydration, the other dry ingredients were combined with the potato shreds in the Hobart mixer and then mixed on a continuous basis at speed 2 for 5 minutes to form the casing material. The composition of the casing material and ingredients is set forth in Table II. The casing material comprised AVICEL Type CL-611F cellulose gel available from FMC Corporation and Crisp Film Starch available from National Starch, Bridgewater, N.J., USA.

TABLE II

| Dehydrated Potato Shreds | 22.5% |
|---|---|
| Dried Potato Flake | 5.0% |
| Starch (Modified) | 2.0% |
| Sugar | 0.5% |
| Salt | 1.0% |
| Water | 67.0% |
| Flavorings | 1.0% |
| Cellulose Gum | 1.0% |

Casings (e.g continuous ropes) having two axial cavities were extruded using a Rheon 207 co-extruder, equipped with the multiple extrusion nozzle, with a casing setting at 3 and filling setting at low. The axial cavities of the potato shred casing were filled with restricted melt cheese sauce available from Kraft Foods Ingredients, Memphis, Tenn., U.S.A. The extruded continuous ropes were conveyed on a conveyor and cut by hand to length of approximately 85 to 110 millimeters to obtain uncooked cut casings. The uncooked cut casings were then cooked by immersion in partially hydrogenated oil at a temperature of 375° F. for a period of 90 seconds using a Pitco Frialator Model E14 electric fryer. The cooked product was then cooled, frozen in a Rinox Blast Chiller and Freezer available from Servolift Eastern Company and reconstituted in a conventional toaster.

The snack food performed adequately during extrusion, frying and reconstitution. Reconstituted product was observed as having acceptable product attributes and organoleptic characteristics.

Example II

Dehydrated potato shreds having an average cross section of about 2.5 millimeters by about 4.8 millimeters, with random length, were re-hydrated with water at 75° C. in a Hobart 80 quart mixer for a total time of 35 minutes with interval mixing of 1.5 minutes at speed 1 every 5 minutes. After re-hydration, the other dry ingredients were combined with the potato shreds in the Hobart mixer and then mixed on a continuous basis at speed 2 for 5 minutes to form the casing material. The composition of the casing material and ingredients is set forth in Table III. The casing material comprised AVICEL Type CL-611F cellulose gel available from FMC Corporation and Crisp Film Starch available from National Starch, Bridgewater, N.J., USA.

TABLE III

| Dehydrated Potato Shreds | 22.5% |
|---|---|
| Dried Potato Flake | 5.0% |
| Starch (Modified) | 2.0% |
| Sugar | 0.5% |
| Salt | 1.0% |
| Water | 67.0% |

TABLE III-continued

| | |
|---|---|
| Flavorings | 1.0% |
| Cellulose Gum | 1.0% |

Two casings were extruded using two Rheon 207 extruders, with dual nozzles having a ratio of 22/18 millimeters (outer diameter/inner diameter) with a casing setting at 3 and filling setting at low. The potato shred casing was filled with restricted melt cheese sauce available from Kraft Foods Ingredients. The extruded multiple rope casings were conveyed on a conveyor and the 2 ropes were physically attached and then compressed. The attached ropes were cut by hand to length of approximately 85 to 110 millimeters to obtain uncooked cut casings. The uncooked cut casings were then cooked by immersion in partially hydrogenated oil at a temperature of 375° F. for a period of 90 seconds using a Pitco Frialator Model E14 electric fryer. The cooked product was then cooled, frozen in a Rinox Blast Chiller and Freezer available from Servolift Eastern Company and reconstituted in a conventional toaster. The snack food performed adequately during extrusion, frying and reconstitution.

Frozen product of Example II was subjected to scanning electron microscopy (SEM) to observe the outer surface of the product. The textured surface of the casing and a continuous potato shred matrix were observed. The casing had little, if any, discontinuities and cellulose gum was observed to be filling void spaces in the potato shred matrix on the outer surface of the casing.

Example III

Casing formulas were prepared to evaluate the replacement of potato shreds with dried potato flakes in the formula. The test casing formula, comprising a higher amount of dried potato flakes, is set forth in Table IV and a control formula is set forth in Table V. Twenty five percent of the dehydrated potato shreds in the control formula (Table V) are replaced with dried potato flakes in the test formula (Table IV).

TABLE IV

| (TEST) | |
|---|---|
| Dehydrated Potato Shreds | 16.99% |
| Dried Potato Flake | 9.66% |
| Water | 68.0% |
| Flavorings (Onion Powder) | 1.0% |
| Dry Mix | 4.35% |

TABLE V

| (CONTROL) | |
|---|---|
| Dehydrated Potato Shreds | 22.65% |
| Dried Potato Flake | 4.00% |
| Water | 68.0% |
| Flavorings (Onion Powder) | 1.0% |
| Dry Mix | 4.35% |

The dry mix comprises modified starch, sugar, salt and AVICEL Type CL-611F cellulose gum from FMC Corporation. The casing was formulated and extruded in accordance with the process and extrusion methods, and equipment described in Example II. Restricted melt cheese sauce from Kraft Foods was used for the filling material. The filled product had a ratio of 75 parts casing to 25 parts filling.

The casings were hand cut into pieces and fried in a Model E14 electric fryer from Pitco Frialator in partially hydrogenated frying oil at a temperature of 375° F. Samples of the control and test runs were fried for periods of 90, 120 and 150 seconds. The test samples comprising a greater amount of dried potato flake performed adequately. The dried potato flake has significantly less cost than potato shreds, and potato shred processing time, e.g. re-hydration, can be decreased with use of more dried potato flakes. Thus, the ability to use larger quantities of dried potato flakes in lieu of potato shreds in the casing represents a substantial cost savings.

We claim:

1. A process for making a hand held convenience snack food product comprising:
   a) re-hydrating dehydrated potato shreds with water,
   b) combining said potato shreds with dry ingredients and mixing continuously to form a dough having a moisture content of about 55% to about 75% and, optionally, allowing the dough to sit at ambient temperature prior to further processing,
   c) extruding the dough in at least one extruder equipped with a multiple extrusion nozzle comprising i) an outer extrusion segment, said outer extrusion segment comprising an outer surface, an opening, an inner surface, a hollow section defined by said inner surface and an outer extrusion port comprising an inner wall, said hollow section terminating at one end at said opening and at the opposite end at said outer extrusion port and ii) an inner extrusion segment comprising a threaded section, a shaped body, two or more channels and at least one inner extrusion port comprising two or more axially adjacent inner port openings and an outer wall, said shaped body terminating at one end at said threaded section and at the other end at said at least one inner extrusion port and said channels being interspaced within said body and having diverging axes which originate at a point between said threaded section and said at least one inner extrusion port and terminating at said two or more inner port openings, said channels being aligned with said two or more inner port openings, wherein said inner extrusion segment is inserted into said hollow section of said outer extrusion segment such that said inner extrusion segment and said outer extrusion segment are aligned radially forming an annular space defined by said inner wall of said outer extrusion port and said outer wall of said inner extrusion port, to form at least one continuous rope having at least one inner wall, an outer wall and two or more axial cavities defined by said inner wall by movement of said dough through said annular space,
   d) filling said two or more axial cavities with filling material,
   e) cutting and crimping said continuous rope to form at least one uncooked cut casing,
   f) cooking said at least one uncooked cut casing to obtain a product, and
   g) freezing said product.

2. The process of claim 1 comprising the additional step of compressing said continuous rope.

3. The process of claim 1 wherein said dough has a moisture content of about 60% to about 72%.

4. The process of claim 1 wherein said potato shreds are re-hydrated by mixing said potato shreds in water at a temperature of about 45° C. to about 95° C. for about 18 to 60 minutes.

5. The process of claim 1 wherein said potato shreds and said dry ingredients are mixed for about 3 to about 5 minutes.

6. The process of claim 1 wherein said inner extrusion segment has two channels and two inner port openings.

7. The process of claim 1 wherein said inner extrusion segment has three channels and three inner port openings.

8. The process of claim 1 wherein said multiple extrusion nozzle further comprises at least one set of indentations at opposing positions on said inner surface of said outer extrusion segment wherein said set of indentations is aligned adjacent to corresponding inner port openings.

9. The process of claim 1 wherein cellulose gum is dispersed in said water prior to the re-hydration step.

10. The process of claim 1 wherein said filling material is selected from the group consisting essentially of meat, cheese, processed diary products, flavorings, sauces, spices and combinations thereof.

11. The process of claim 1 wherein said dry ingredients comprise dried potato flakes, starch, sweetener, cellulose gum and flavorings.

12. The process of claim 11 wherein said cellulose gum is selected from the group consisting essentially of microcrystalline cellulose, methylcellulose, carboxymethylcellulose, hydroxyethylcellulose, hydroxypropylcellulose, hydroxypropylmethylcellulose and combinations thereof.

13. The process of claim 11 wherein said starch is a modified starch.

14. The process of claim 11 having from about 3% to about 10% dried potato flakes on a wet basis.

15. A process for making a hand held convenience snack food product comprising:
 a) providing fresh cut potato shreds,
 b) combining said potato shreds with dried potato flakes, starch, sweetener, cellulose gum, flavorings and other ingredients and mixing continuously for about 3 to about 5 minutes to form a dough having a moisture content of about 55% to about 75% and, optionally, allowing the dough to sit at ambient temperature prior to further processing,
 c) extruding the dough in at least one extruder equipped with a multiple extrusion nozzle comprising i) an outer extrusion segment, said outer extrusion segment comprising an outer surface, an opening, an inner surface, a hollow section defined by said inner surface and an outer extrusion port comprising an inner wall, said hollow section terminating at one end at said opening and at the opposite end at said outer extrusion port and ii) an inner extrusion segment comprising a threaded section, a shaped body, two or more channels and at least one inner extrusion port comprising two or more axially adjacent inner port openings and an outer wall, said shaped body terminating at one end at said threaded section and at the other end at said at least one inner extrusion port and said channels being interspaced within said shaped body and having diverging axes which originate at a point between said threaded section and said at least one inner extrusion port and terminating at said two or more inner port openings, said channels being aligned with said two or more inner port openings, wherein said inner extrusion segment is inserted into said hollow section of said outer extrusion segment such that said inner extrusion segment and said outer extrusion segment are aligned radially forming an annular space defined by said inner wall of said outer extrusion port and said outer wall of said inner extrusion port, to form at least one continuous rope having at least one inner wall, an outer wall and two or more axial cavities defined by said inner wall by movement of said dough through said annular space,
 d) filling said two or more axial cavities with filling material,
 e) cutting and crimping said continuous rope to form at least one uncooked cut casing,
 f) cooking said at least one uncooked cut casing to obtain a product, and
 g) freezing said product.

16. The process of claim 15 comprising the additional step of compressing said continuous rope.

17. The process of claim 15 wherein said inner extrusion segment has two channels and two inner port openings.

18. The process of claim 15 wherein said inner extrusion segment has three channels and three inner port openings.

19. The process of claim 15 wherein said multiple extrusion nozzle further comprises at least one set of indentations at opposing positions on said inner surface of said outer extrusion segment wherein said set of indentations is aligned adjacent to corresponding inner port openings.

20. The process of claim 15 wherein said dough has a moisture content of about 60% to about 72%.

21. The process of claim 15 wherein said cellulose gum is selected from the group consisting essentially of microcrystalline cellulose, methylcellulose, carboxymethylcellulose, hydroxyethylcellulose, hydroxypropylcellulose, hydroxypropylmethylcellulose and combinations thereof.

22. The process of claim 15 wherein said starch is modified starch.

23. The process of claim 15 having from about 3% to about 10% dried potato flakes on a wet basis.

* * * * *